United States Patent
Huang

(10) Patent No.: US 7,394,220 B2
(45) Date of Patent: Jul. 1, 2008

(54) USB POWER PACK AND CHARGER

(76) Inventor: Yu-Huei Huang, 3F, No. 142, Li-De Street, Chungho City, Taipei Hsien (TW)

( * ) Notice: Subject to any disclaimer, the term of this patent is extended or adjusted under 35 U.S.C. 154(b) by 243 days.

(21) Appl. No.: 11/271,783

(22) Filed: Nov. 14, 2005

(65) Prior Publication Data

US 2006/0214630 A1  Sep. 28, 2006

(30) Foreign Application Priority Data

Mar. 23, 2005  (TW) ............................. 94204492 U

(51) Int. Cl.
*H02J 7/00* (2006.01)
(52) U.S. Cl. ......................... 320/112; 320/107
(58) Field of Classification Search ................ 320/107, 320/110, 111, 112, 113, 114, 115, 119; 429/96, 429/99; 307/66, 150, 154, 155
See application file for complete search history.

(56) References Cited

U.S. PATENT DOCUMENTS

| 3,928,791 | A | * | 12/1975 | Mullersman | ................ 320/119 |
| 4,636,703 | A | * | 1/1987 | Tohya et al. | ................ 320/110 |
| 4,666,278 | A | * | 5/1987 | Uematsu et al. | ............. 396/539 |
| 5,977,747 | A | * | 11/1999 | Huang | ........................ 320/115 |
| 6,305,984 | B1 | * | 10/2001 | Katoh et al. | ................ 439/607 |
| 6,396,015 | B1 | * | 5/2002 | Ko | .............................. 200/529 |
| 6,495,988 | B1 | * | 12/2002 | Liao | ........................... 320/111 |
| 6,563,713 | B2 | * | 5/2003 | Yang | .......................... 361/752 |
| 6,774,605 | B2 | * | 8/2004 | Usui et al. | ................... 320/112 |
| 6,874,907 | B2 | * | 4/2005 | Liao | ............................ 362/183 |
| 2004/0229119 | A1 | * | 11/2004 | Lin et al. | ..................... 429/164 |
| 2006/0170393 | A1 | * | 8/2006 | Yang | ........................... 320/107 |

* cited by examiner

*Primary Examiner*—Adolf Berhane
*Assistant Examiner*—M'Baye Diao
(74) *Attorney, Agent, or Firm*—Troxell Law Office, PLLC

(57) ABSTRACT

A mobile battery charging pack includes a casing, which has positive and negative electrodes for the connection of a battery set, a plurality of power input/output terminals respectively electrically coupled to the battery set, and a power control switch that controls the connection between the power input/output terminals and the battery set and the function of the power input/output terminal for power into to charge the battery set with external power supply or to charge the battery of an external mobile electronic device with the battery power supply of the battery set.

12 Claims, 5 Drawing Sheets

USB POWER PACK AND CHARGER

BACKGROUND OF THE INVENTION

1. Field of the Invention

The present invention relates to a battery pack and more particularly, to a mobile battery charging pack, which has DC3.7V, DC5.0V and USB interface power input/output functions.

2. Description of the Related Art

Dry battery has been developed for a long period. Different battery boxes may be used to hold different battery cells in different electric or electronic products such as electronic toys, mini radios, flashlights, etc. There is known a charging battery box adapted to hold a rechargeable battery, for example, a nickel cadmium battery and to convert AC power supply into DC power supply for charging the rechargeable battery. These conventional battery boxes commonly have the battery cells connected in series to provide one particular DC voltage. A battery box may hold two battery cells that are positioned in parallel. However, these two battery cells are electrically connected in series.

Further, when the power of the battery of a mobile electronic device such as a PDA or the like is used up and there is no external power supply available for charging the battery of the mobile electronic device, the mobile electronic device becomes unworkable. Taiwan Patent 103972 (equivalent to U.S. Pat. No. 5,537,022), which was issued to the present inventor, discloses a battery pack entitled "ENCLOSED BATTERY HOLDER". This design of battery pack is practical for use to charge the battery of a mobile electronic device.

Further, USB (Universal Series Bus) interface has been intensively used in computer electronics nowadays. A USB connector allows DC power input as well as DC power output. However, the aforesaid Taiwan Patent 103972 (equivalent to U.S. Pat. No. 5,537,022) does not provide a USB connector for obtaining DC power supply from one USB port of a personal computer.

SUMMARY OF THE INVENTION

The present invention has been accomplished under the circumstances in view. It is the main object of the present invention to provide a mobile battery charging pack, which can be used to charge the battery of an external mobile electronic device and is connectable to one USB port of a personal computer to obtain DC power supply from the personal computer for charging the rechargeable battery set therein.

To achieve this and other objects of the present invention, the mobile battery charging pack comprises a casing, the casing comprising a front wall and a rear wall arranged at front and rear sides thereof, at least one first locating groove and at least one second locating groove symmetrically formed on the inside near two distal ends, and at least one positive electrode and at least one negative electrode respectively mounted in the at least one first locating groove and the at least one second locating groove; a battery set mounted in the casing and electrically connected between the at least one positive electrode and the at least one negative electrode; and a cover adapted to close the casing; where the casing defines a chamber between the front wall and the positive and negative electrodes, the chamber comprising at least one power input/output terminal respectively electrically coupled to the at least one positive electrode and the at least one negative electrode for output of battery power supply from the battery set to an external electronic device connected thereto and for input of external power supply means into the battery set selectively, the at least one power input/output terminal including a USB (Universal Serial Bus) connector.

DETAILED DESCRIPTION OF THE PREFERRED EMBODIMENT

Figure 1:
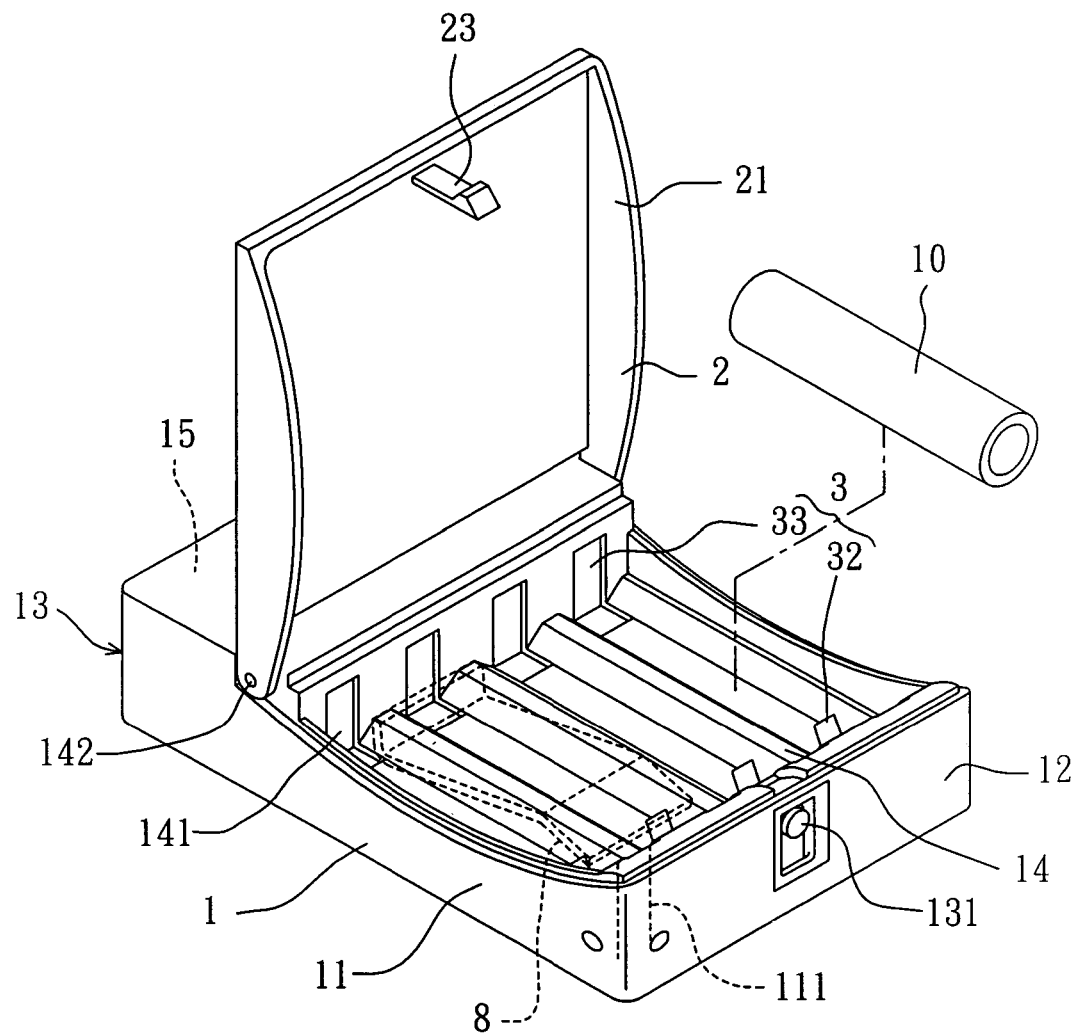
FIG. 1 is an exploded view of a mobile battery charging pack according to the present invention.
Figure 2:
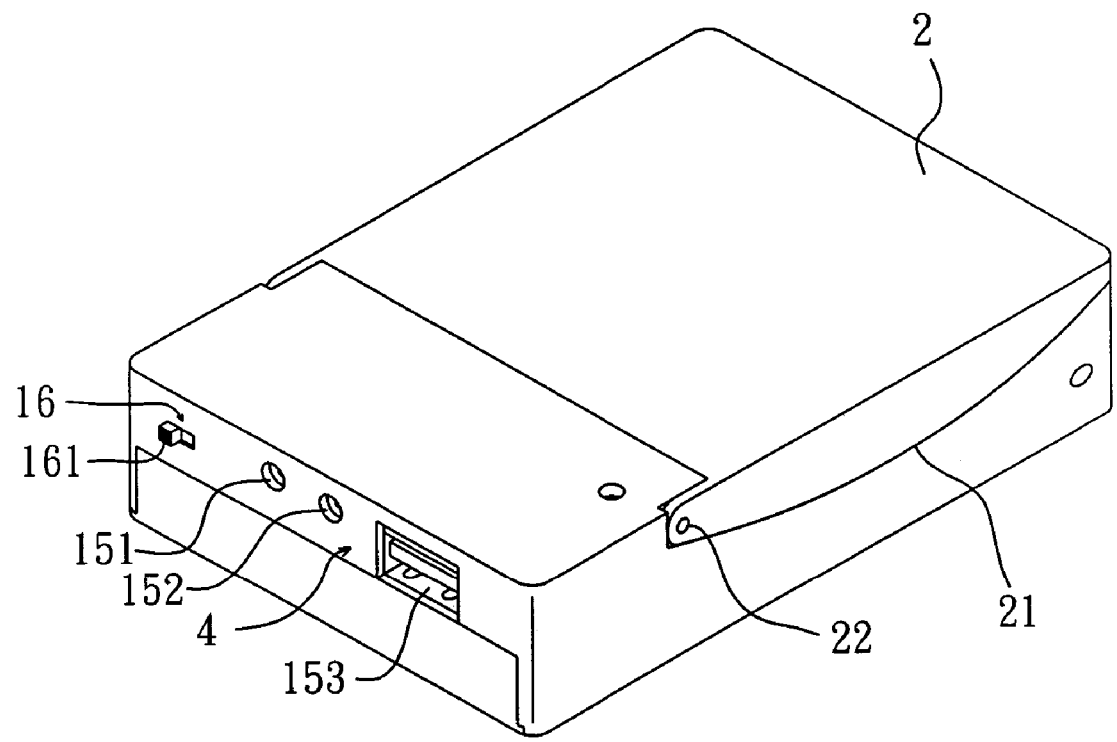
FIG. 2 is an elevational assembly view of the mobile battery charging pack according to the present invention.
Figure 3:
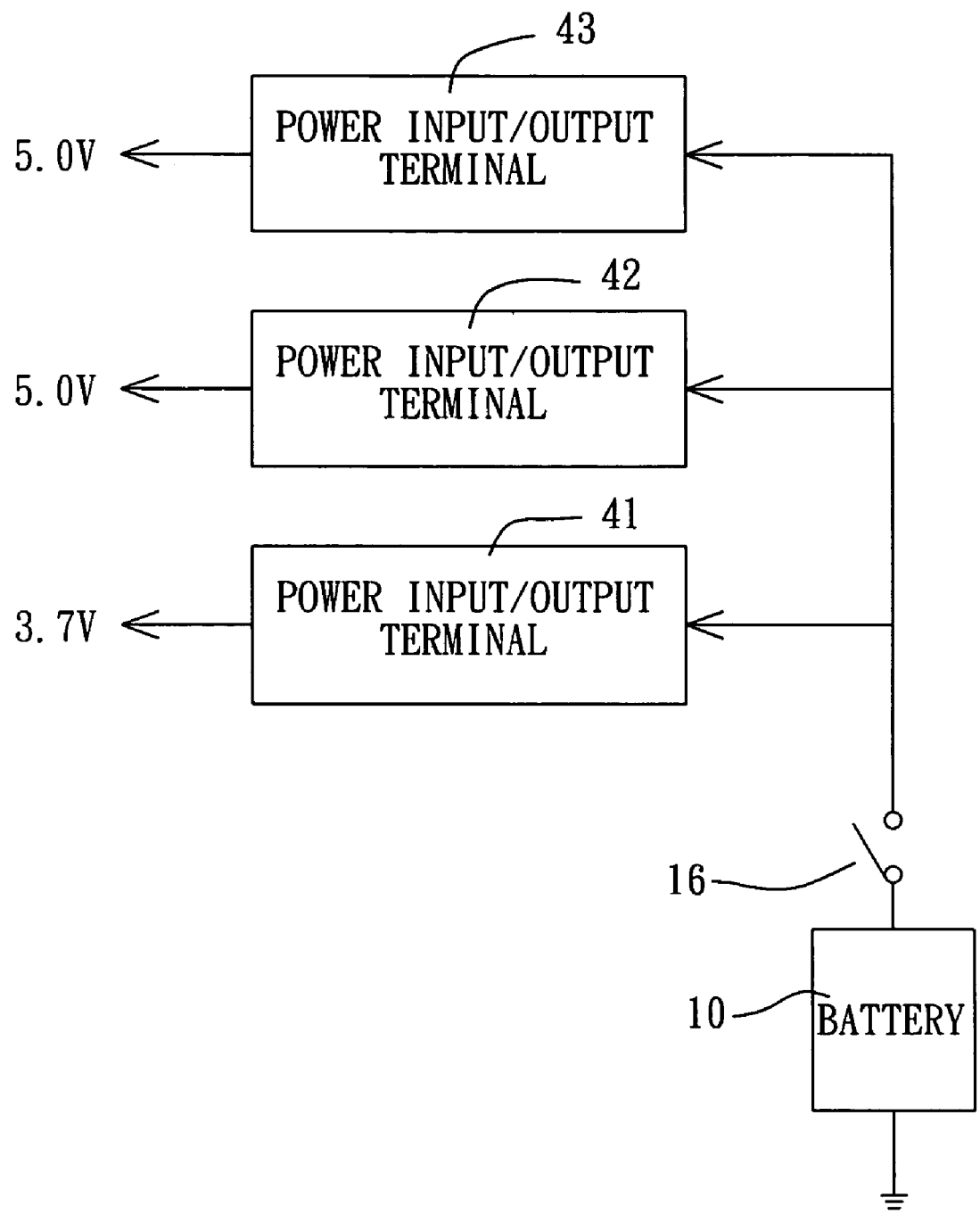
FIG. 3 is a circuit block diagram of the mobile battery charging pack according to the present invention.

Referring to FIGS. 1~3, a mobile battery charging pack in accordance with the present invention is shown comprising a casing 1, a cover 2, a metal electrode set 3, and a plurality of power input output terminals 4.

The casing 1 is a partially enclosed hollow shell having two sidewalls 11, a front wall 12 connected between one end of each of the two sidewalls 11, a rear wall 13 connected between the other end of each of the two sidewalls 11, and a plurality of partition ribs 14 set between the two sidewalls 11 and dividing the holding space of the casing 1 into a plurality of battery seats for accommodating at least three battery cells 10. The battery cells 10 can be AA, AAA or N type, or rechargeable battery cells. Further, the two sidewalls 11 are symmetrically, having the respective top edge curved smoothly inwards. Locating grooves 111 and 141 are formed inside the casing 1 for the mounting of the positive electrodes 33 and negative electrodes 32 of the metal electrode set 3 subject to series or parallel connection circuit principle. Further two pivot pins 142 are respectively provided at the two sidewalls 11 at two sides of the locating grooves 141.

The casing 1 further defines a chamber 15 between the front wall 12 and the metal electrode set 3. A power control switch 16 is installed in the chamber 15, having a switching lever 161 extending out of a hole 154 (not shown) in the rear wall 13 for operation by the user to switch on/off power supply. Further, a retaining rod 131 is suspending in the front wall 12. The chamber 15 has a plurality of holes 151, 152 and 153 for accommodating or the passing of the power input/output terminals 4. For example, the hole 151 is for accommodating a DC 3.7V power input/output terminal; the hole 152 is for accommodating a DC5.0 power input/output terminal; and hole 153 is for accommodating a USB connector for DC5.0V power input/output.

The cover 2 is adapted to cover the top open side of the casing 1, having two arched side panels 21 fitting the inwardly curved top edge of each of the two sidewalls 11 of the casing 1, two pivot holes 22 respectively formed in the two arched side panels 21 near one end and respectively coupled to the pivot pins 142 at the casing 1 for enabling the cover 2 to be turned relative to the casing 1 to close or open the casing 1 for loading/unloading the battery cells 10, and a hook 23 provided on the middle of the front side thereof for engaging the retaining rod 131 to hold the cover 2 in the close position.

The metal electrode set 3 comprises a plurality of negative electrodes 32 and positive electrodes 33 respectively mounted in the locating grooves 111 and 141 inside the casing 1 for the connection of a number of battery cells 10 to form a series or parallel circuit. The metal electrode set 3 is electrically coupled to the power control switch 16 and the power input/output terminals 4. By means of the control of the power control switch 16, the power input/output terminals 4 are selectively set for power input or power output.

The power input/output terminals 4 are respectively mounted in the holes 151, 152 and 153 of the chamber 15 and electrically coupled to the metal electrode set 3 and the power control switch 16 for the connection of an external electronic device, for example, a cellular telephone to provide the connected external electronic device with the necessary working voltage. The power input/output terminals 4 can be respectively made in the form of a power jack for the connection of the power plug of an external electronic device, or a power plug for the connection of the power jack of an external electronic device.

As shown in FIG. 3, the power input/output terminals 4 include a 3.7V power input/output terminal 41, a 5.0V power input/output terminal 42, and a USB jack 43. The 3.7V power input/output terminal 41 is installed in the hole 151. The 5.0V power input/output terminal 42 is installed in the hole 152. The USB jack 43 is installed in the hole 153. The 3.7V power input/output terminal 41, the 5.0V power input/output terminal 42 and the USB jack 43 are respectively electrically coupled to the power control switch 16 and the metal electrode set 3. By means of the control of the power control switch 16, battery power supply from the battery cells 10 is transmitted through the metal electrode set 3 to the 3.7V power input/output terminal 41, the 5.0V power input/output terminal 42 or the USB jack 43 for output. For DC5.0V power output, the number of the battery cells 10 is 4. For DC3.7V power output, the number of the battery cells 10 is 3.

Figure 4:
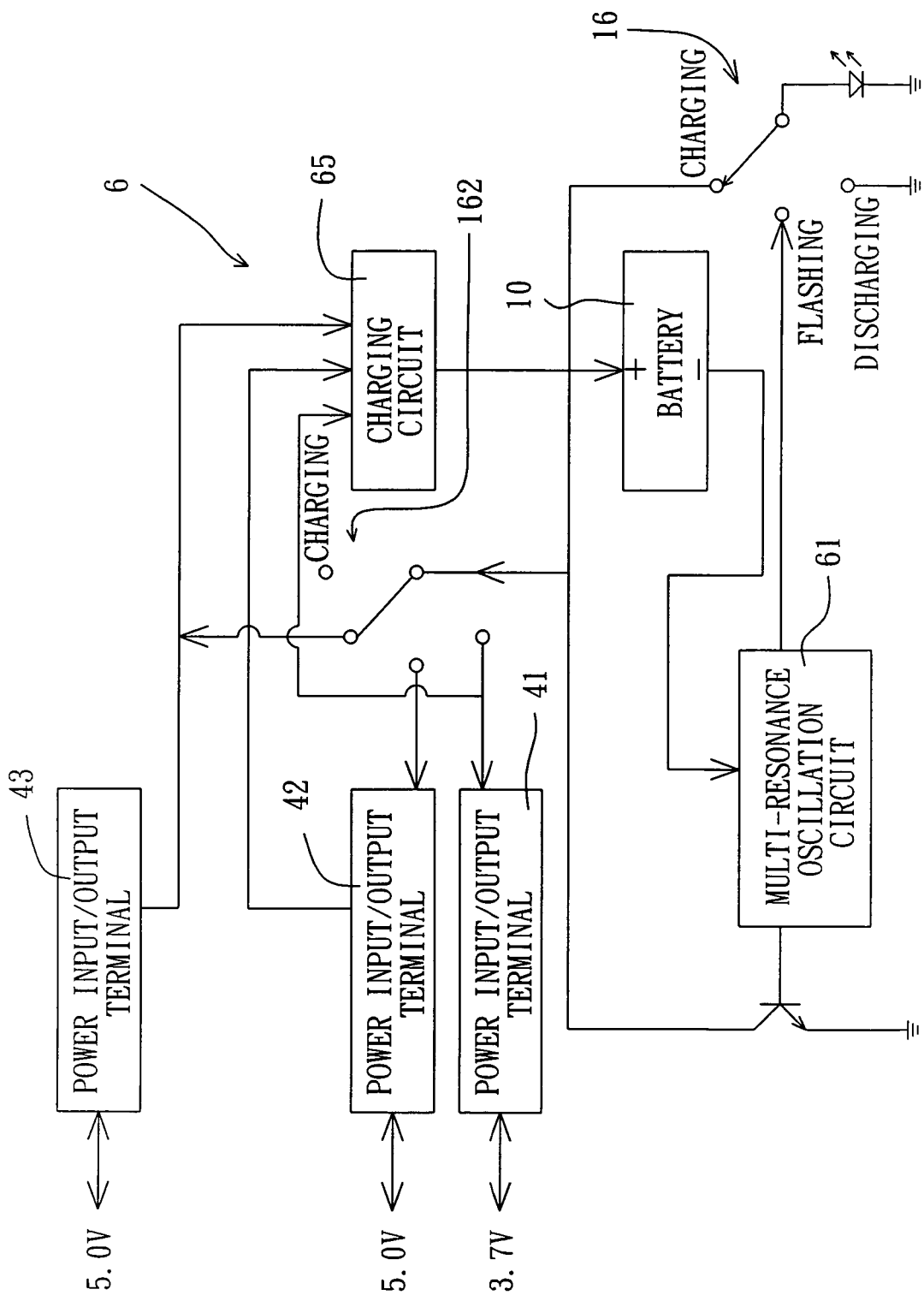
FIG. 4 shows an alternate form of the circuit block diagram according to the present invention.

FIG. 4 shows an alternate form of the circuit block diagram according to the present invention. According to this alternate form, a circuit board 6 is electrically coupled between power input/output terminals 4 and the power control switch 16 for function selection control. The circuit board 6 comprises a multi-resonance oscillation circuit 61 and a charging circuit 65. Further, the battery cells 10 according to this embodiment are rechargeable battery cells. According to this embodiment, the power control switch 16 is for power on/off and intermittent connection controls so as to control on, off, or flashing of an external light set (not shown) that is used to decorate a person, or an object (for example, a Christmas tree).

The power input/output terminals 41, 42 and 43 are installed in the chamber 15. The power input/output terminals 41, 42 and 43 can be made in the form of an electric jack or plug and respectively disposed in the holes 151, 152 and 153. As shown in FIG. 4, the power input/output terminals 41, 42 and 43 are respectively electrically coupled to the circuit board 65 and a second control switch 162. The second control switch 162 is a four-step switch. When city power supply is available, for example, when in the house, the power control switch 16 is switched to the charging position, and the second control switch 162 is switched to the first (charging) position, and then use a power adapter (not shown) to electrically couple the power input/output terminal 41 or 42 to the 110V or 220V electric outlet or use a USB cable to electrically couple the power input/output terminal (USB connector) 43 to one USB port of a personal computer (not shown), enabling the power input/output terminal 41, 42 or 43 to obtain DC power to charge the rechargeable battery cells 10.

When switched the power control switch 16 to the flashing position and switched the second control switch 162 to the charging position, battery power supply is transmitted from the battery cells 10 through the multi-resonance oscillation circuit 61 to the external light set, causing the light set to flash.

When switched the power control switch 16 to the discharging position and switched the second control switch 162 to the second position, battery power supply is transmitted from the battery cells 10 through the second control switch 162 to the power input/output terminal (USB connector) 43 for DC5.0V power output to the external electronic device connected thereto.

When switched the power control switch 16 to the discharging position and switched the second control switch 162 to the fourth position and when there are four battery cells 4 installed in the mobile battery charging pack, battery power supply is transmitted from the battery cells 4 through the second control switch 162 to the power input/output terminal 42 for DC5.0V power output to the external electronic device connected thereto.

When switched the power control switch 16 to the discharging position and switched the second control switch 162 to the fourth position and when the number of the battery cells 10 is 3, battery power supply is transmitted from the battery cells 10 through the second control switch 162 to the power input/output terminal 41 for DC3.7V power output to the external electronic device connected thereto. Therefore, the mobile battery charging pack is practical for use indoor as well as outdoor.

For easy carrying by the user, the mobile battery charging pack has a clip 8 fixedly provided at the back side of the casing 1 for fastening.

Figure 5:
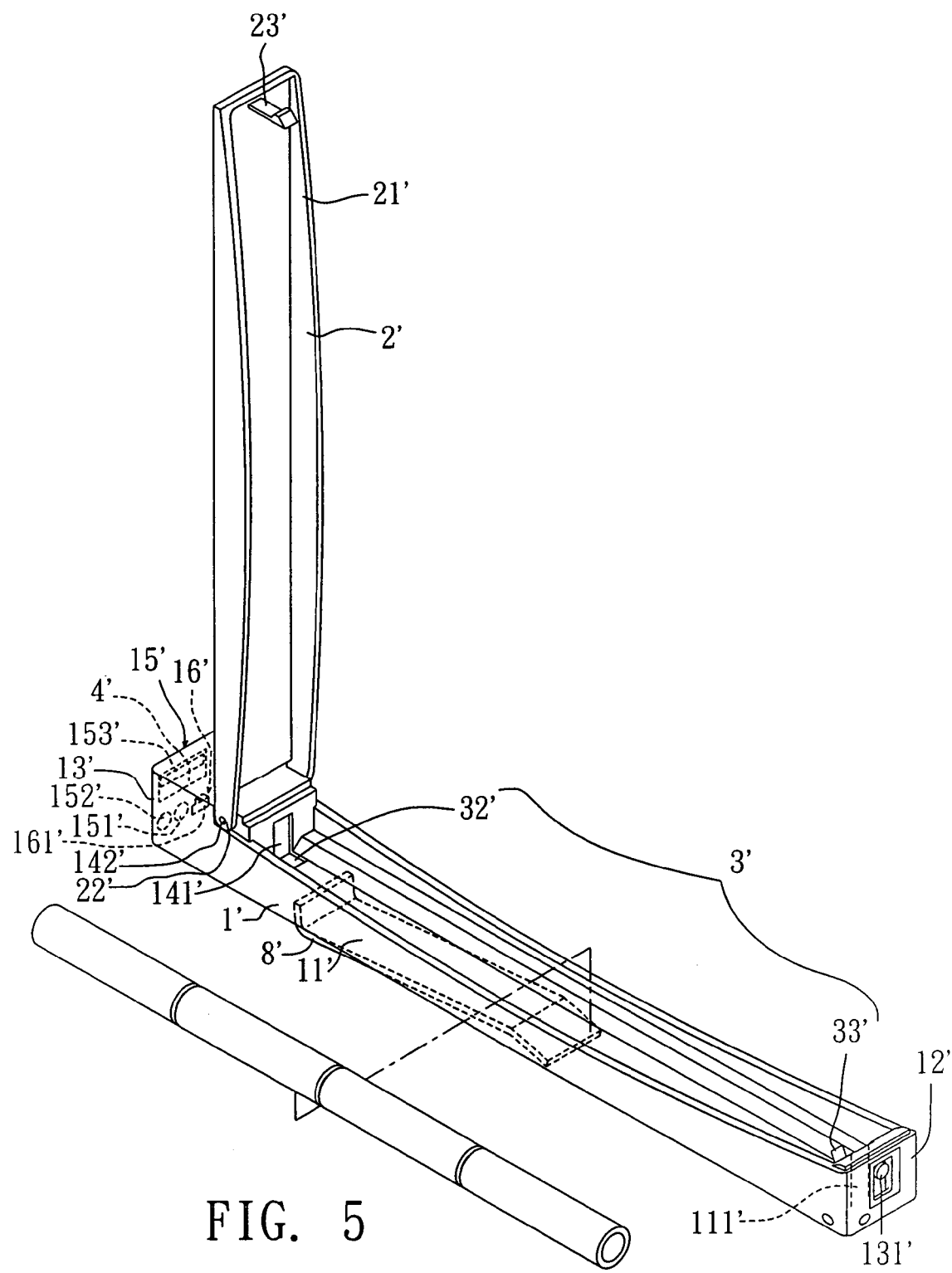
FIG. 5 is perspective view of the mobile battery charging pack according to the second embodiment of the present invention.

FIG. 5 is a perspective view of the mobile battery charging pack according to the second embodiment of the present invention. According to this embodiment, the mobile battery charging pack comprises a casing 1', a cover 2', a metal electrode set 3', and power input/output terminals 4'.

The casing 1' is a partially enclosed hollow shell having two sidewalls 11', a front wall 12' connected between one end of each of the two sidewalls 11', a rear wall 13' connected between the other end of each of the two sidewalls 11', a chamber 15' defined between the two sidewalls 11' at one end, and two locating grooves 111' and 141' disposed on the inside near two distal ends for the positioning of the positive electrode 32' and negative electrode 33' of the metal electrode set 3' respectively for accommodating at least one, for example, four battery cells 10'. The battery cells 10' can be AA, AAA or N type, or rechargeable battery cells. Further, the two sidewalls 11' are symmetrically, having the respective top edge curved smoothly inward. Further two pivot pins 142' are respectively provided at the two sidewalls 11' at two sides of the locating groove 141'.

A power control switch 16' is installed in the chamber. 15', having a switching lever 161' extending out of a hole 154' (not shown) in the rear wall 13' for operation by the user to switch on/off power supply. Further, a retaining rod 131' is suspending in the front wall 12'. The chamber 15' has a plurality of holes 151', 152' and 153' for accommodating or the passing of the power input/output terminals 4'. For example, the hole 151' is for accommodating a DC 3.7V power input/output terminal; the hole 152' is for accommodating a DC5.0 power input/output terminal; and hole 153' is for accommodating a USB connector for DC 5.0V power input/output.

The cover 2' is adapted to cover the casing 1', having two arched side panels 21' fitting the inwardly curved top edge of each of the two sidewalls 11' of the casing 1', two pivot holes 22 respectively formed in the two arched side panels 21' near one end and respectively coupled to the pivot pins 142'. at the casing 1' for enabling the cover 2' to be turned relative to the casing 1' to close or open the casing 1' for loading/unloading the battery cells, and a hook 23' provided on the middle of the front side thereof for engaging the retaining rod 131' to hold the cover 2' in the close position.

The metal electrode set 3' comprises one negative electrodes 32' and positive electrodes 33' respectively mounted in the locating grooves 111' and 141' inside the casing 1' for the connection of battery cells 10' to form a series circuit. The metal electrode set 3' is electrically coupled to the power control switch 16' and the power input/output terminals 4'. By means of the control of the power control switch 16', the power input/output terminals 4' are selectively set for power input or power output.

The power input/output terminals 4' are respectively mounted in the holes 151', 152' and 153' of the chamber 15' and electrically coupled to the metal electrode set 3' and the power control switch 16' for the connection of an external electronic device, for example, a cellular telephone to provide the connected external electronic device with the necessary working voltage. The power input/output terminals 4' can be respectively made in the form of a power jack for the connection of the power plug of an external electronic device, or a power plug for the connection of the power jack of an external electronic device.

According to this second embodiment of the present invention, the mobile battery charging pack also comprises a power control switch 16', a switching lever 161', a second control switch 162', two arched side panels 21', two pivot holes 22', a hook 23', a circuit board 6', a multi-resonance oscillation circuit 61', and a charging circuit 65'. Therefore, this embodiment achieves the same functions as stated above. These members are equivalent to the power control switch 16, switching lever 161, second control switch 162, arched side panels 21, two pivot holes 22, hook 23, circuit board 6, multi-resonance oscillation circuit 61 and charging circuit 65 of the aforesaid first embodiment. Therefore, no further detailed description in this regard is necessary.

Further, for easy carrying by the user, the mobile battery charging pack has a clip 8' fixedly provided at the back side of the casing 1' for fastening.

Although a particular embodiment of the invention has been described in detail for purposes of illustration, various modifications and enhancements may be made without departing from the spirit and scope of the invention.

What the invention claimed is:

1. A mobile battery charging pack comprising:
   a casing, said casing comprising a front wall and a rear wall arranged at front and rear sides thereof, at least one first locating groove and at least one second locating groove symmetrically formed on the inside near two distal ends, and at least one positive electrode and at least one negative electrode respectively mounted in said at least one first locating groove and said at least one second locating groove;
   a battery set mounted in said casing and electrically connected between said at least one positive electrode and said at least one negative electrode;
   a cover adapted to close said casing, said casing defines a chamber between said rear wall and said positive and negative electrodes, said chamber comprising at least one power input/output terminal respectively electrically coupled to said at least one positive electrode and said at least one negative electrode for output of battery power supply from said battery set to an external electronic device connected thereto and for input of external power supply means into said battery set selectively, said at least one power input/output terminal including a USB (Universal Serial Bus) connector;
   a circuit board electrically coupled between a first power control switch and said at least one power input/output terminal, said first power control switch is a three-step switch, which allows charging of said battery set with an external DC power supply when switched to a first position, allows output of the battery power supply from said battery set to said at least one power input/output terminal intermittently when switched to a second position, and allows discharging of the battery power supply from said battery set to an external electronic device being connected to said at least one power input/output terminal; and
   a second control switch electrically coupled to said at least one power input/output terminal and said positive and negative electrodes, said second control switch being a four-step switch for controlling different connection modes between said battery set and said at least one power input/output terminals.

2. The mobile battery charging pack as claimed in claim 1, wherein said casing comprises two pivot pins respectively symmetrically provided at two opposite sidewalls thereof; said cover comprises two arched side panels, and two pivot holes respectively formed in said arched side panels and respectively pivotally coupled to said pivot pins.

3. The mobile battery charging pack as claimed in claim 1, wherein the first power control switch is electrically coupled to said at least one power input/output terminal and said at least one positive electrode and said at least one negative electrode and adapted to control power connection between said battery set and said at least one power input/output terminal.

4. The mobile battery charging pack as claimed in claim 1, wherein said at least one power input/output terminal further includes an electric socket exposed to the outside of said chamber for power input/output.

5. The mobile battery charging pack as claimed in claim 1, wherein said at least one power input/output terminal further includes an electric plug exposed to the outside of said chamber for power input/output.

6. The mobile battery charging pack as claimed in claim 5, where said electric plug fits the power input terminal of a mobile electronic device.

7. The mobile battery charging pack as claimed in claim 1, wherein said at least one power input/output terminal further includes a DC3.7V power jack and a DC5.0V power jack.

8. The mobile battery charging pack as claimed in claim 1, wherein said circuit board comprises a charging circuit adapted to obtain a charging power supply from external power supply means through said at least one power input/output terminal to charge said battery set.

9. The mobile battery charging pack as claimed in claim 1, wherein said second control switch allows charging of said battery set with an external DC power supply when switched to a first position, allows output of the battery power supply of said battery set through said USB connector when switched to a second position, allows output of DC5.0V from said battery set through one DC5.0V power input/output terminal of said at least one power input/output terminal when switched to a third position, and allows output of DC3.7V from said battery set through one DC3.7V power input/output terminal of said at least one power input/output terminal when switched to a third position.

10. The mobile battery charging pack as claimed in claim 1, wherein said casing further comprises at least one partition rib that divides an inside space of said casing into a plurality of battery seats for accommodating said battery set, and a clip fixedly provided at a back side thereof for fastening; said battery set includes a plurality of battery cells respectively mounted in said battery seats and electrically coupled to said at least one positive electrode and said at least one negative electrode, said battery cells being selected from one of AA, AAA and N type battery cells.

11. The mobile battery charging pack as claimed in claim 1, wherein said casing further comprises a retaining member disposed at the rear wall for securing said cover in a close position.

12. The mobile battery charging pack as claimed in claim 11, wherein said cover comprises a hook extended from a front side thereof and adapted to engage the retaining member of said casing when said cover is closed on said casing.

* * * * *